US012767021B2

(12) United States Patent
Kadam et al.

(10) Patent No.: US 12,767,021 B2
(45) Date of Patent: Oct. 20, 2026

(54) SEATBACK ANTI-ROTATION MECHANISM

(71) Applicant: Ford Global Technologies, LLC, Dearborn, MI (US)

(72) Inventors: Mangesh Kadam, Canton, MI (US); Srinivas Reddy Malapati, Novi, MI (US); Murugan Sundaram Ramasamy, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 171 days.

(21) Appl. No.: 18/422,483

(22) Filed: Jan. 25, 2024

(65) Prior Publication Data

US 2025/0242735 A1 Jul. 31, 2025

(51) Int. Cl.

*B60R 22/46* (2006.01)
*B60N 2/00* (2006.01)
*B60N 2/433* (2006.01)
*B60N 2/68* (2006.01)
*B60R 22/40* (2006.01)

(52) U.S. Cl.

CPC ............. *B60N 2/68* (2013.01); *B60N 2/0029* (2023.08); *B60N 2/433* (2013.01); *B60R 22/40* (2013.01); *B60R 22/46* (2013.01); *B60R 2022/404* (2013.01)

(58) Field of Classification Search

CPC ........ B60N 2/4221; B60N 2/43; B60N 2/433; B60R 22/46; B60R 2022/4638

See application file for complete search history.

(56) References Cited

U.S. PATENT DOCUMENTS 4,165,128 A 8/1979 Strowick et al.
4,390,208 A 6/1983 Widmer et al.
4,733,912 A 3/1988 Secord
5,295,729 A * 3/1994 Viano ................ B60N 2/42745 297/216.14
5,460,429 A 10/1995 Whalen
5,476,307 A 12/1995 Whalen
6,481,799 B1 11/2002 Whalen
6,644,746 B2 11/2003 Bruck et al.
6,719,368 B1 * 4/2004 Neale ..................... B60N 2/665 297/216.12
7,077,472 B2 * 7/2006 Steffens, Jr. ....... B60N 2/42781 297/216.12
8,979,193 B2 * 3/2015 Nonomiya ............. B60N 2/682 297/216.13
9,010,854 B2 * 4/2015 Nonomiya ............... B60N 2/68 297/216.14
9,073,463 B2 * 7/2015 Kuriyama ............. B60N 2/433

(Continued)

FOREIGN PATENT DOCUMENTS

CN 104334419 A * 2/2015 ............. B60R 22/40
CN 106064606 A * 11/2016 ......... B60R 22/4623

(Continued)

*Primary Examiner* — Timothy J Brindley

(74) *Attorney, Agent, or Firm* — Frank A. MacKenzie; Brooks Kushman P.C.

(57) ABSTRACT

A seat system including a seat with a seat bottom having a seat bottom frame and a seatback having a seatback frame pivotably supported by the seat bottom frame. The seat system also includes a spool rotatably mounted to the seat bottom frame and a strap retractably extendable from the spool and fixed to the seatback frame.

20 Claims, 7 Drawing Sheets

(56) References Cited

U.S. PATENT DOCUMENTS

| | | | | |
|---|---|---|---|---|
| 10,059,234 | B2 * | 8/2018 | Barbat | B60N 2/003 |
| 10,427,563 | B2 * | 10/2019 | Dhaini | B60N 2/20 |
| 10,611,281 | B1 * | 4/2020 | Jaradi | B60R 22/18 |
| 10,618,437 | B2 * | 4/2020 | Fukawatase | B60R 22/26 |
| 11,220,236 | B2 * | 1/2022 | Gray | B60R 22/08 |
| 2002/0089224 | A1 | 7/2002 | Bruck et al. | |
| 2002/0089225 | A1 | 7/2002 | Bruck et al. | |
| 2006/0220426 | A1 * | 10/2006 | Moffatt | B60N 2/42736<br>297/216.19 |

FOREIGN PATENT DOCUMENTS

| | | | | | |
|---|---|---|---|---|---|
| CN | 117301985 | A | * | 12/2023 | B60N 2/42745 |
| CN | 117922485 | A | * | 4/2024 | B60R 22/4676 |
| CN | 118596965 | A | * | 9/2024 | B60N 2/433 |
| DE | 10261893 | A1 | * | 7/2004 | B60N 2/4249 |
| DE | 202023103452 | U1 | * | 9/2024 | B62B 9/104 |
| EP | 1992528 | A2 | * | 11/2008 | B60R 22/3413 |
| EP | 4480748 | A1 | * | 12/2024 | B62B 9/104 |
| FR | 3084858 | A1 | * | 2/2020 | B60N 2/433 |
| KR | 20070089306 | A | * | 8/2007 | B60R 22/46 |
| WO | 2010147594 | A1 | | 12/2010 | |
| WO | WO-2025016602 | A1 | * | 1/2025 | B60R 22/46 |

* cited by examiner

SEATBACK ANTI-ROTATION MECHANISM

BACKGROUND

A vehicle may include a seat and a seatbelt assembly. The seat can include a seatback and a seat bottom that can support an occupant of the seat. For example, the occupant of the seat may sit on a top surface of the seat bottom and recline against the seatback. The seatbelt assembly may include a seatbelt retractor and webbing retractably payable from the seatbelt retractor. The seatbelt assembly may include an anchor coupled to the webbing, and a latch plate that engages a buckle. The seatbelt assembly may be disposed adjacent to a seat of the vehicle. The webbing may extend continuously from the seatbelt retractor to the anchor. For example, one end of the webbing feeds into the seatbelt retractor, and the other end of the webbing is fixed to the anchor. The seat and the seatbelt assembly can work in conjunction to control occupant kinematics in the event of certain vehicle impacts. In some examples, the seatbelt assembly may be a seat integrated restraint (SIR) in which various components of the seatbelt assembly, e.g., the retractor, webbing guide, and/or the anchor, are carried by the seat. In some examples, this may allow the seat to be rotatable about a generally vertical axis to different facing positions.

DETAILED DESCRIPTION

Figure 1A:
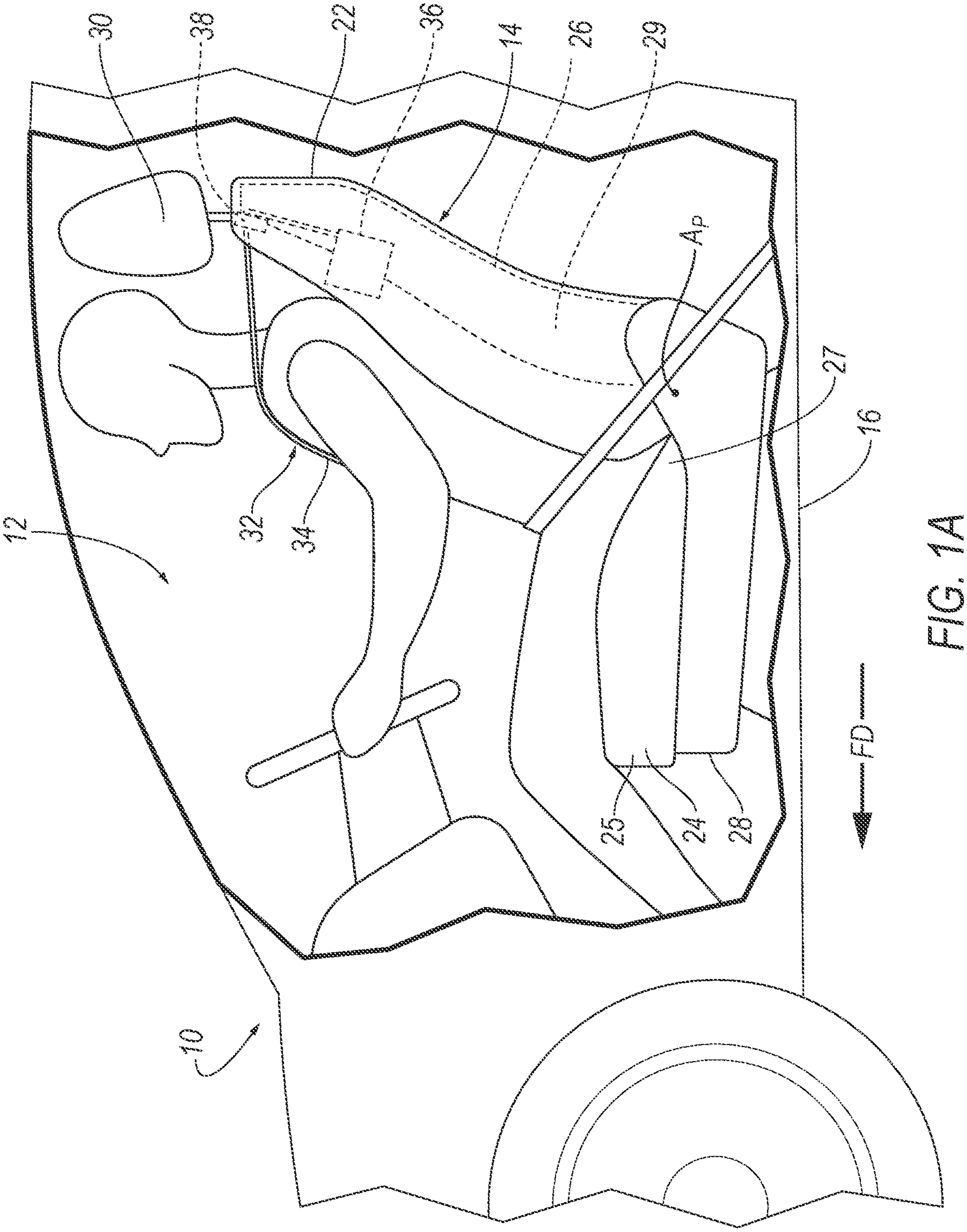
FIG. 1A is a side view of a portion of a vehicle including a seat.

A seat system includes a seat with a seat bottom having a seat bottom frame and a seatback having a seatback frame pivotably supported by the seat bottom frame. The seat system also includes a spool rotatably mounted to the seat bottom frame and a strap retractably extendable from the spool and fixed to the seatback frame.

The spool can be mounted to the seat bottom frame cross-vehicle between a left and a right bolster of the seatback. The spool can be rotationally biased with a torsion spring to retract the strap.

The seat system can include a locking mechanism operative to prevent the spool from rotating. The locking mechanism can include an extendable pin positioned to engage the spool when extended. The spool can include a pair of flanges and wherein at least one of the flanges includes multiple apertures positioned to receive the pin. The locking mechanism can include an actuator to extend the pin.

The seat system can include one or more processors and one or more memory devices storing instructions executable by the one or more processors to activate the actuator in response to certain vehicle impacts in order to lock the spool and resist forward movement of the seatback relative to the seat bottom. The actuator can be a solenoid device. The actuator can be a pyrotechnic device.

The seat system can include a transverse member attached to an upper portion of the seatback frame, and wherein the strap is secured to the transverse member. The seatback pivots with respect to the seat bottom about a pivot axis and the spool is positioned seat rearward of the pivot axis. The seat system can further comprise a transverse guide bar attached to the seatback frame between the transverse member and the spool.

The seat system can include a housing secured to the seat bottom frame and wherein the spool is rotatably coupled to the housing with an axle. The seat system can further comprise a locking mechanism having an extendable pin to engage the spool. The extendable pin can be parallel with the axle.

The seatback pivots with respect to the seat bottom about a pivot axis and the spool is positioned seat rearward of the pivot axis. The spool is positioned below the pivot axis. The strap can be fabric. The seat system can further comprise a seatbelt assembly supported by the seat.

With reference to the Figures, where like numerals indicate like features throughout the several views, an example of a seat system having a seatback anti-rotation mechanism 50 can include a seat 14 with a seat bottom 24 and a seatback 22. The seat bottom 24 can have a seat bottom frame 28 and the seatback 22 can have a seatback frame 26 pivotably supported by the seat bottom frame 28. A spool 52 is rotatably mounted to the seat bottom frame 28 and a strap 54 is retractably extendable from the spool 52 and fixed to the seatback frame 26. The seatback anti-rotation mechanism 50 can include a locking mechanism 76 operative to prevent the spool 52 from rotating, thereby resisting movement of the seatback 22 in a seat-forward direction FD. When the spool 52 is locked, the strap 54 is prevented from unwinding from the spool 52 and the seatback 22 is prevented from forward movement by tension in the strap 54.

With reference to FIG. 1A, the vehicle 10 may be any suitable type of ground vehicle, e.g., a passenger or commercial automobile such as a sedan, a coupe, a truck, a sport utility, a crossover, a van, a minivan, a taxi, a bus, etc. The vehicle 10 may define a passenger cabin 12 to house occupants, if any, of the vehicle 10. The passenger cabin 12 may extend across the vehicle 10, e.g., from a left side of the vehicle 10 to a right side of the vehicle 10. The passenger cabin 12 includes a front end and a rear end with the front end being in front of the rear end during forward movement of the vehicle 10.

One or more seats, such as seat 14, may be supported in the passenger cabin 12, e.g., by a floor 16 of the vehicle 10. Each seat 14 includes a seatback 22 and a seat bottom 24 that can support the occupant of the seat 14. For example, the occupant of the seat 14 may sit atop a top surface of the seat bottom 24 and recline against the seatback 22. While seat 14 shown in the figures is in the front driver position, the disclosed technology can be applied to any seat in the vehicle.

The seatback 22 may include a seatback frame 26. The seatback frame 26 may include tubes, beams, etc. Specifically, the seatback frame 26 may include a pair of upright frame members 29. The upright frame members are elongated, and specifically, are elongated in a generally upright direction (e.g., along a seat-vertical axis) when the seatback 22 is in a generally upright position. The upright frame members 29 are spaced apart from each other in a cross-vehicle direction. The seatback frame 26 may include one or more cross-members 33 extending between the upright frame members 29.

The seat bottom 24 has a front end 25 and a rear end 27. The front end 25 is seat-forward of the rear end 27 in the seat-forward direction FD. The seat bottom 24 can include a seat bottom frame 28. The frame 28 may include tubes, beams, etc. Specifically, the seat bottom frame 28 may include a pair of frame members elongated in the seat-forward direction FD, e.g., between the front end 25 and the rear end 27 of the seat bottom 24. The frame members 29 can be laterally spaced from each other. The seat bottom frame 28 may include cross-members extending between the frame members. The seat bottom frame 28 can include a seat pan. The seat pan may be generally planar and extend from one of the frame members to the other of the frame members. The seat pan may be fixed to the frame members.

The seatback frame 26 and the seat bottom frame 28 may be of any suitable plastic material, e.g., carbon fiber reinforced plastic (CFRP), glass fiber-reinforced semi-finished thermoplastic composite (organosheet), etc. As another example, some or all components of the seatback frame 26 and the seat bottom frame 28 may be formed of a suitable metal, e.g., steel, aluminum, etc. The seatback 22 and the seat bottom 24 can include suitable covers. The covers may include upholstery and padding. The upholstery may be cloth, leather, faux leather, or any other suitable material. The upholstery may be stitched in panels around the frames. The padding may be between the upholstery and the frames. The padding may be foam or any other suitable material.

The seatback 22 is supported by the seat bottom 24 at the rear end 27. The seat bottom 24 extends from the seatback 22 in the seat-forward direction FD of the seat 14. The rear end 27 is proximate to the seatback 22 and the front end 25 is distal from the seatback 22. The seatback 22 may be stationary or movable relative to the seat bottom 24. In an example, the seatback 22 is pivotably supported by the seat bottom 24 and may be selectively pivotable to a desired position by an occupant of the seat 14. In such an example, the seatback 22 is pivotable with respect to the seat bottom 24 about a pivot axis Ap. The seatback 22 and the seat bottom 24 may be adjustable in multiple degrees of freedom. Specifically, the seatback 22 and the seat bottom 24 may themselves be adjustable, in other words, adjustable components within the seatback 22 and/or the seat bottom 24, and/or may be adjustable relative to each other. The seatback 22 may be selectively pivotable about the pivot axis Ap and selectively locked in position relative to the pivot axis Ap with any suitable mechanism, including mechanical and/or electronic components, and in some examples, including currently known mechanisms.

The seat 14 may include a head restraint 30. The head restraint 30 may be supported by the seatback 22. The head restraint 30 may be at a top end of the seatback 22. The head restraint 30 may be stationary or movable relative to the seatback 22. The seatback 22 and the head restraint 30 may be adjustable in multiple degrees of freedom. Specifically, the seatback 22 and/or the head restraint 30 may themselves be adjustable and/or may be adjustable relative to each other.

A seatbelt assembly 32 is associated with each seat 14. The seatbelt assembly 32 can include a retractor 36 and a webbing 34. The webbing 34 is retractably payable from the retractor 36. The seatbelt assembly 32 may include an anchor (not visible) fixed to the webbing 34 and a latch plate (not visible) that engages a buckle (not visible). The webbing 34 may extend continuously from the retractor 36 through a webbing guide 38 and to the anchor. The latch plate may slide freely along the webbing 34, and when engaged with the buckle, divide the webbing 34 into a lap belt and a shoulder belt. The webbing 34 may be fabric, e.g., polyester.

The seatbelt assembly 32 may be a seat-integrated restraint (SIR) in which various components of the seatbelt assembly 32, e.g., the retractor 36 and the webbing guide 38, are carried by the seat back frame 26. For example, the frame of the retractor 36 may be fixed to the frame 26 of the seatback 22 via weld, fastener, or other suitable structure. The retractor 36 may be supported by the seatback 22 at the top end as shown. It is contemplated that future regulatory and technology evolution may allow for safe and permissible use of seats that are selectively rotatable to different facing positions, and in such examples, the seatbelt assembly 32 may be a SIR.

Figure 1B:
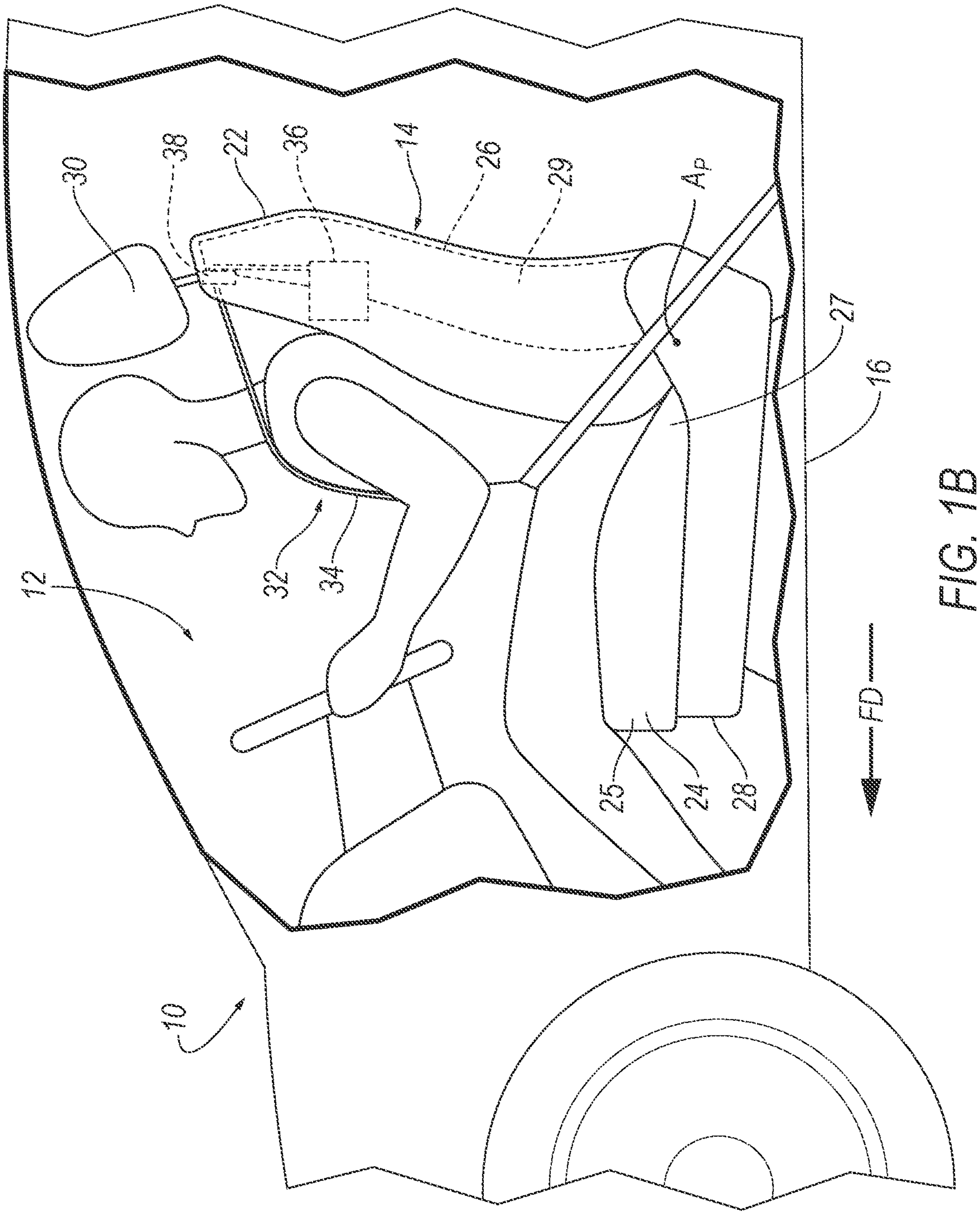
FIG. 1B is a side view of a portion of a vehicle including a seat.

Comparing FIGS. 1A and 1B, as a result of certain vehicle impacts, the occupant can pull against the webbing 34, which is attached to the seatback 22 via the webbing guide 38 and the retractor 36, applying forces to the seatback 22 to pivot it forward with respect to the seat bottom 24 in a seat-forward direction FD as shown in FIG. 1B.

Figure 2:
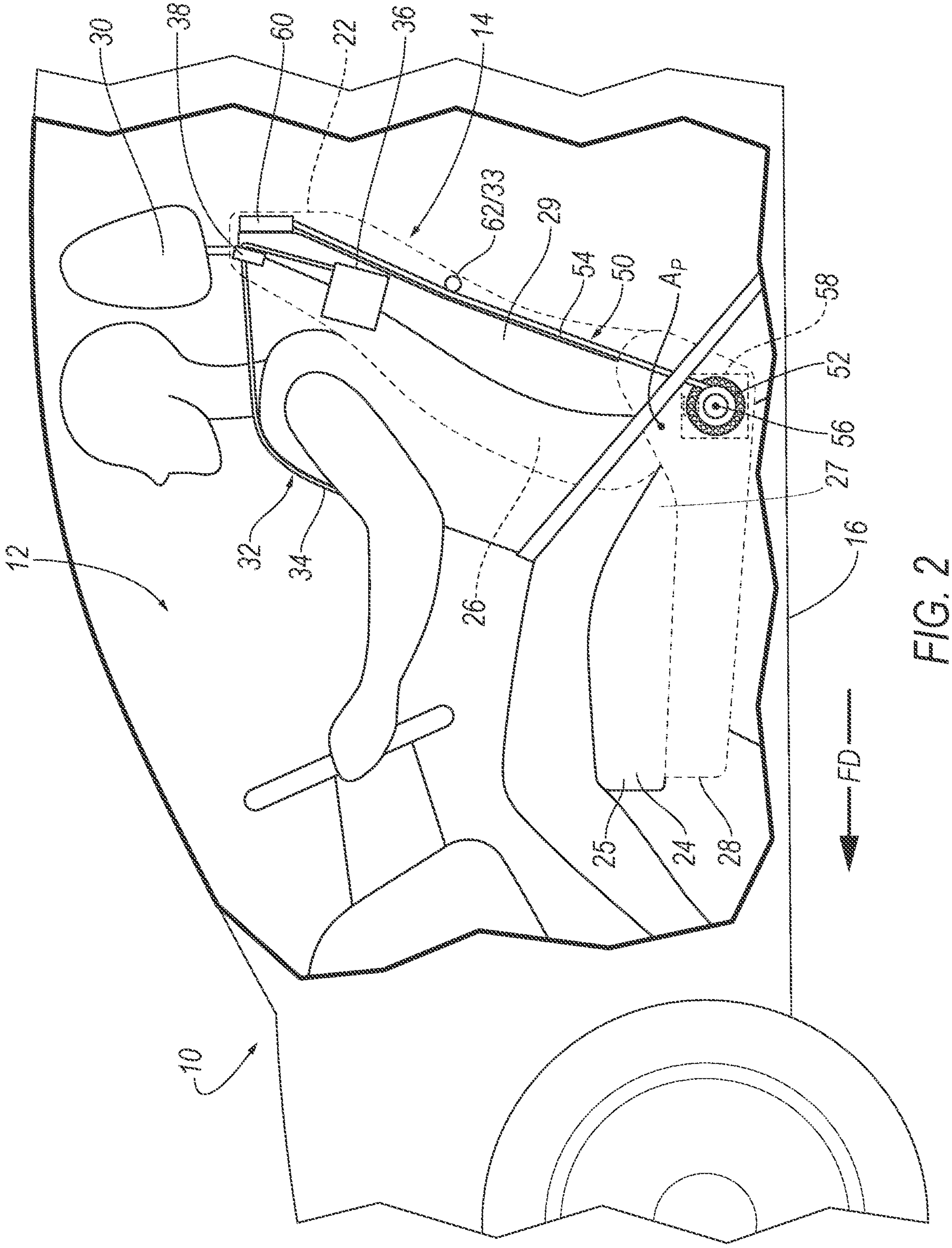
FIG. 2 is a side view of a seat including a seatback anti-rotation mechanism.

With reference to FIG. 2, the seatback anti-rotation mechanism 50 counteracts the forward movement of the seatback 22. The seatback anti-rotation mechanism 50 can include the spool 52 rotatably mounted to the seat bottom frame 28. The seatback anti-rotation mechanism 50 also includes a strap 54 that is retractably extendable from the spool 52 and is fixed to an upper end portion of the seatback frame 26. In an example, the spool 52 rotates about an axle 56 which is supported by a housing 58. The housing 58 can be fixed to the seat bottom frame 28 via weld, fastener, or other suitable structure. In an example, the spool 52 (e.g., axle 56) can be positioned seat rearward of and/or below the pivot axis Ap. When the spool 52 is locked, as described more fully below, forward movement of the seatback 22 is prevented as the seatback 22 pulls on strap 54 which is effectively fixed to the seat bottom frame 28.

Figure 3:
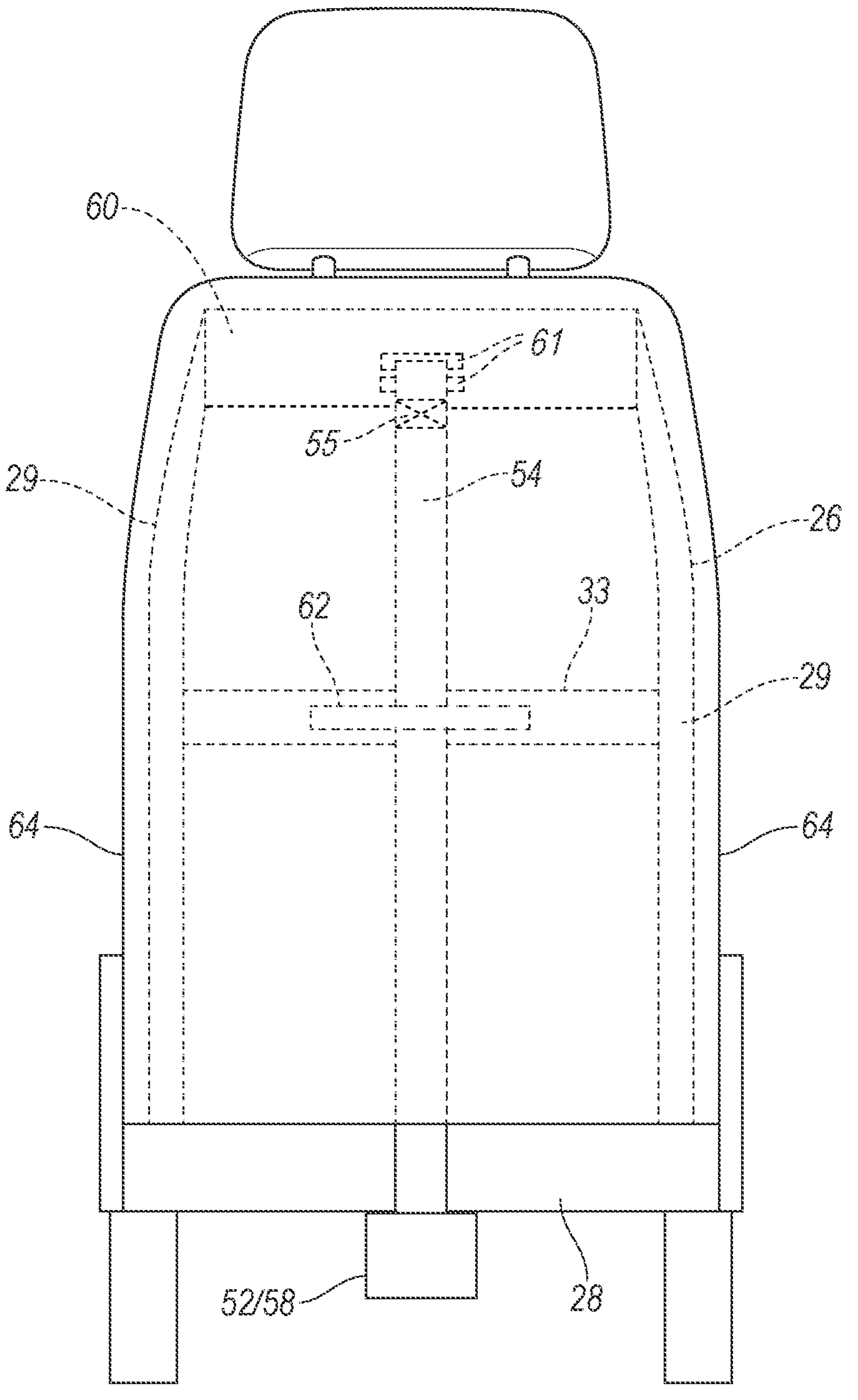
FIG. 3 is a rear view of the seat shown in FIG. 2.

With further reference to FIG. 3, the spool 52 can be mounted to the seat bottom frame 28 cross-vehicle between left and right bolsters 64 of the seatback 22. A transverse member 60 can be attached to an upper portion of the seatback frame 26 extending between the upright frame members 29. The strap 54 is secured to the transverse member 60. In an example, the strap 54 is attached to the seatback 22, e.g., beyond an upper one-quarter of the seatback 22. The transverse member 60 may be formed of a suitable metal, e.g., steel, aluminum, etc. The transverse member 60 can be fixed to the seatback frame 26 via weld, fastener, or other suitable structure. In an example, the strap 54 can be looped through openings 61, overlapped onto itself, and stitched together with X-pattern stitches 55 as shown. In another example, the strap 54 can be looped around the transverse member 60, overlapped onto itself, and stitched together with X-pattern stitches 55.

A transverse guide bar 62 can be attached to the seatback frame 26 between the transverse member 60 and the spool 52. In an example, the guide bar 62 can be attached to the seatback frame cross-member 33. The strap 54 can be positioned between the cross-member 33 and the guide bar 62 such that the strap 54 follows the contour of the seatback 22 underneath the seatback covering. In operation, the guide bar 62 is a reaction surface for the strap 54. The guide bar 62 prevents the strap 54 from pushing against the seat covering which would tend to reduce the tension in the strap 54. The guide bar 62 may be formed of a suitable metal, e.g., steel, aluminum, etc. The guide bar 62 can be fixed to the seatback frame 26 via weld, fastener, or other suitable structure. In an alternative example, the strap 54 can run behind (i.e., seat forward) of the cross-member 33.

One end of the strap 54 is retractably extendable from the spool 52, and the other end is fixed to an upper end portion of the seatback frame 26, i.e., it does not move relative to the seatback frame 26. The spool 52 is rotationally biased, e.g., with a torsion spring 68, to retract the strap 54 by winding the strap 54 around the spool 52. The strap 54 may be a fabric webbing, e.g., polyester. In an example, the strap 54 can have a tensile strength greater than the forces against the seatback 22 that are expected in certain vehicle impacts. The strap 54 can also have a stiffness, i.e., a limited amount of stretch, that minimizes the amount of forward movement of the seatback 22. In an example, the strap 54 can have tensile strength and stiffness characteristics similar to those of seatbelt webbing 34. In another example, the strap 54 can be a polyester webbing having a breaking strength in the range of 6,000-12,000 lbs., such as two-inch ratchet straps commonly used to secure heavy loads with minimum stretching.

Figure 4:
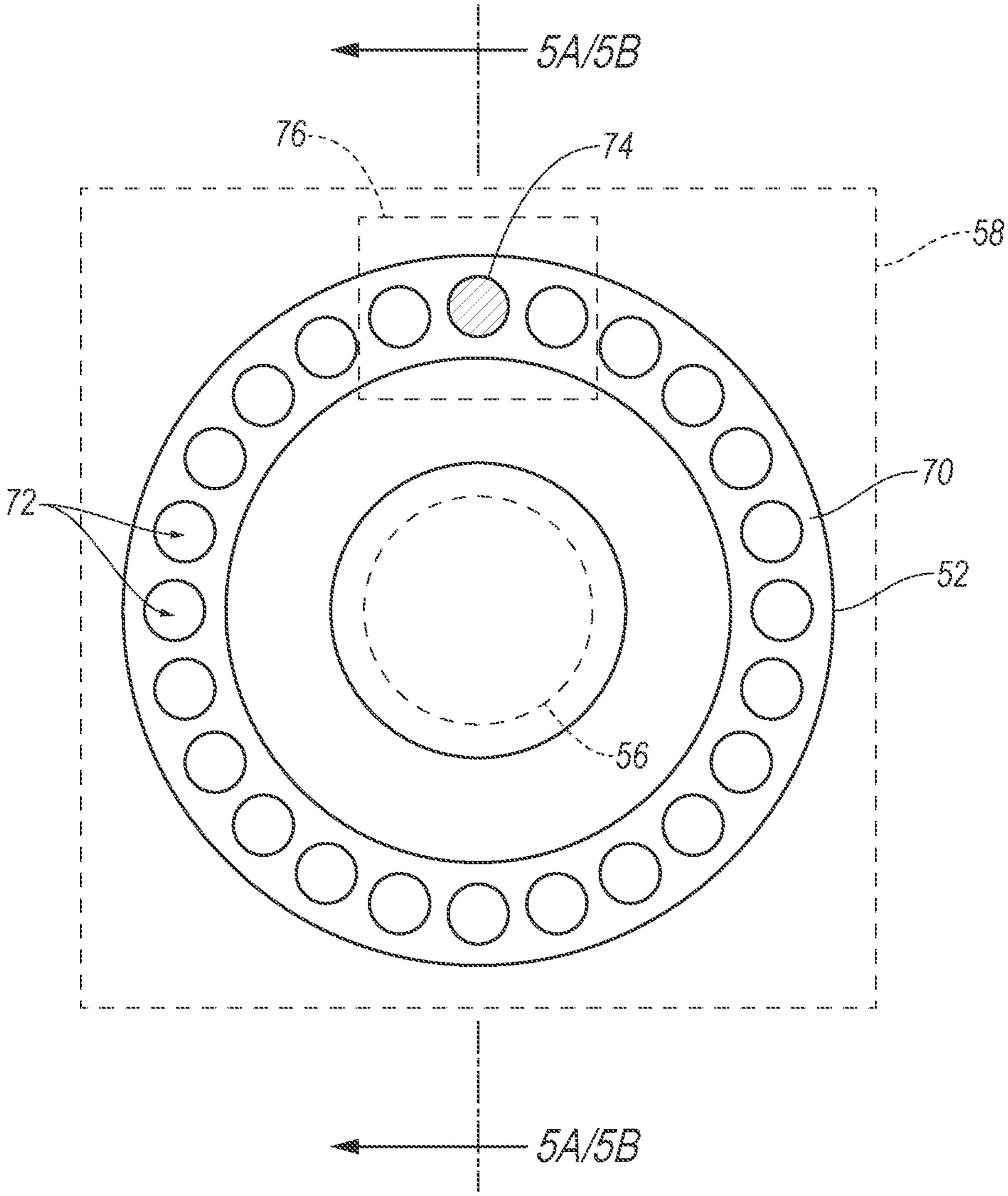
FIG. 4 is a side view of the spool assembly shown in FIGS. 2 and 3.

The locking mechanism 76 is operative to prevent the spool from rotating relative to the housing 58. In the examples shown in the Figures, specifically as shown in FIG. 4, the spool 52 can include a pair of flanges 70 with at least one of the flanges 70 including multiple apertures 72 positioned around the circumference of the spool 52. At least one locking mechanism 76 is positioned adjacent the spool 52. The locking mechanism 76 includes an extendable pin 74 positioned to engage one of the multiple apertures 72 when extended, as described further below.

Figure 5B:
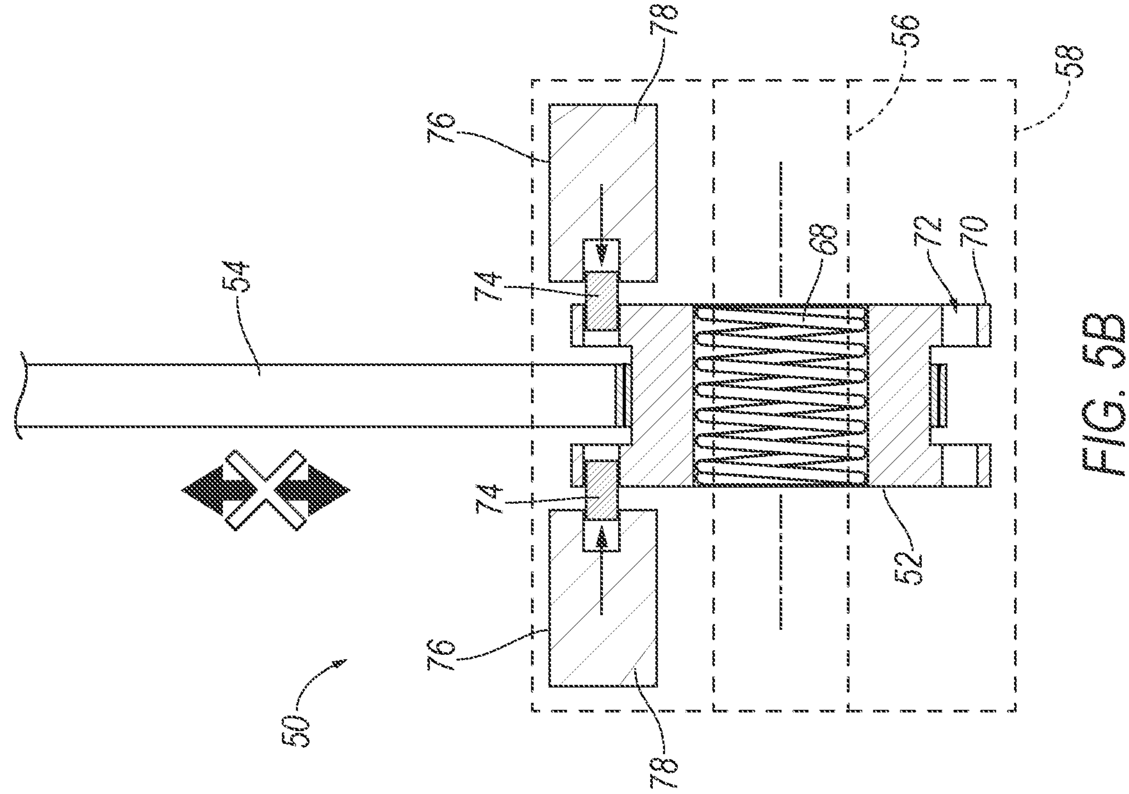
FIG. 5B is a cross-sectional view of the spool assembly with the locking mechanism engaged.
Figure 5A:
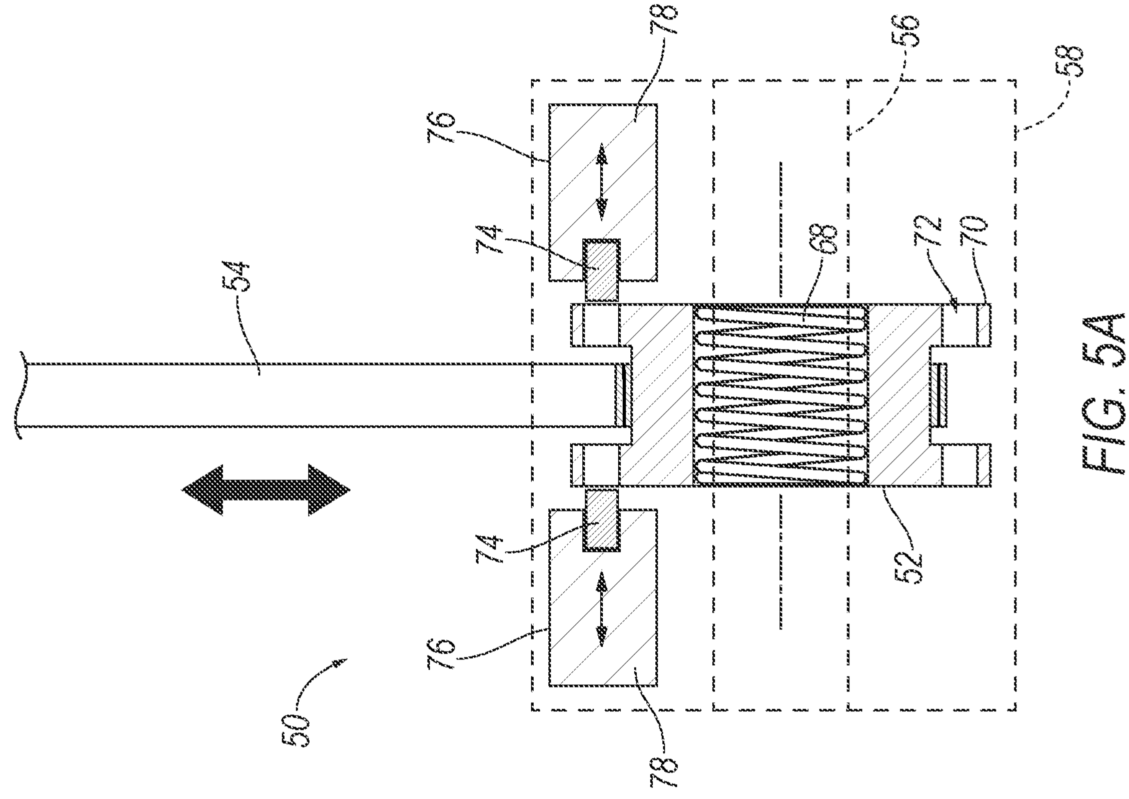
FIG. 5A is a cross-sectional view of the spool assembly with the locking mechanism disengaged.

With reference to FIGS. 5A and 5B, the seatback anti-rotation mechanism 50 can include two locking mechanisms 76 positioned on either side of the spool 52. The locking mechanisms can include an actuator 78 to extend the pins 74. The actuators 78 can be a solenoid device or a pyrotechnic device, for example. A solenoid can include an electromagnetic that when energized extends the pin 74 against a solenoid spring e.g., a compression spring (not shown). When the solenoid is deenergized the spring retracts the pin 74. A pyrotechnic device can include a pyrotechnic charge behind the pin 74 to move the pin relative to the housing 58.

With reference to FIG. 5A, the spool 52 is rotationally biased, e.g., with a torsion spring 68, to retract the strap 54 by winding the strap 54 around the spool 52. When the locking pins 74 are disengaged, the torsion spring 68 maintains tension on strap 54 while allowing the strap 54 to wind and unwind from the spool 52. Accordingly, the seatback 22 can be adjusted forward and rearward as desired. With reference to FIG. 5B, once the actuators 78 are activated, the locking pins 74 extend into corresponding apertures 72 formed through the flanges 70, thereby locking the spool 52 in position. In an example, the locking pins 74 are parallel with the axle 56.

Figure 6:
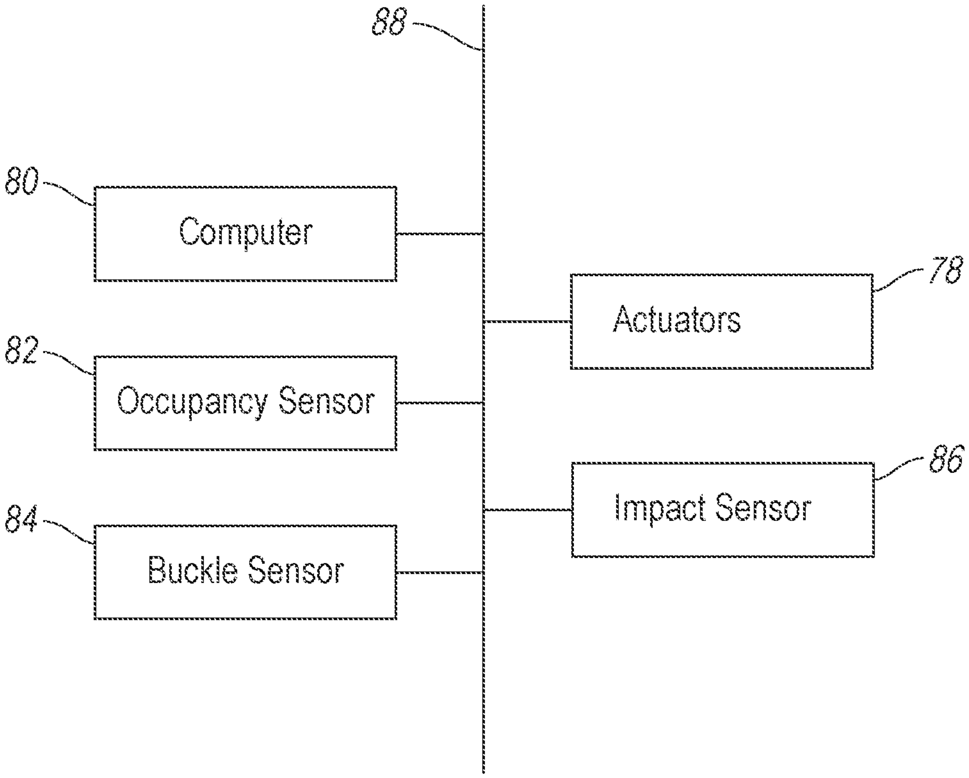
FIG. 6 is a block diagram of a system of the vehicle.

With reference to FIG. 6, a seat system can include a seat 14 and the seatback anti-rotation mechanism 50, as well as a computer 80, a network 88, and various sensors, including an occupancy sensor 82, a buckle sensor 84, and an impact sensor 86. The vehicle 10 may include an occupancy sensor 82 configured to detect occupancy of the seat 14. The occupancy sensor 82 may include visible-light or infrared cameras directed at the seat, weight sensors supported by the seat bottom 24, or other suitable structure, including those conventionally known. The occupancy sensor 82 provides data to the computer 80 indicating whether the seat 14 is occupied or unoccupied.

The vehicle 10 may include a buckle sensor 84 that detects engagement of the latch plate of the seatbelt assembly 32 with the buckle. The buckle sensor 84 may include a switch, a contact sensor, a hall effect sensor, or any other suitable structure for detecting engagement of the latch plate with the buckle, including conventional structures. The buckle sensor 84 provides data to the computer 80 indicating whether the latch plate is engaged with, or disengaged from, the buckle.

The vehicle 10 may include at least one impact sensor 86 for sensing certain vehicle impacts (e.g., impacts of a certain magnitude, direction, etc.). The vehicle computer 80 may activate the locking mechanism actuators 78, e.g., provide power to a solenoid or an impulse to a pyrotechnic charge, when the impact sensor 86 senses certain vehicle impacts. Alternatively or additionally to sensing certain vehicle impacts, the impact sensor 86 may be configured to sense certain vehicle impacts prior to impact, i.e., pre-impact sensing. The impact sensor 86 is configured to detect certain vehicle impacts. In other words, a “certain vehicle impact” is an impact of the type and/or magnitude for which activation of the seatback anti-rotation mechanism 50 is designed i.e., “certain” indicates the type and/or magnitude of the impact. The type and/or magnitude of such “certain vehicle impacts” may be pre-stored in the computer 80, e.g., a restraints control module and/or a body control module. The impact sensor 86 may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc. The impact sensor 86 may be located at numerous points in or on the vehicle 10.

The vehicle 10 may include a communication network 88. The communication network 88 includes hardware, such as a communication bus, for facilitating communication among vehicle components, e.g., the computer 80, the occupancy sensor 82, the buckle sensor 84, the impact sensor 86, the actuators 78, etc. The communication network 88 may facilitate wired or wireless communication among the vehicle components in accordance with a number of communication protocols such as controller area network (CAN), Ethernet, Wi-Fi, Local Interconnect Network (LIN), and/or other wired or wireless mechanisms. Alternatively or additionally, in cases where the computer 80 comprises a plurality of devices, the communication network 88 may be used for communications between devices represented as the computer 80 in this disclosure.

The computer 80 may be a microprocessor-based computer implemented via circuits, chips, or other electronic components. The computer 80 includes a processor, a memory, etc. The memory of the computer 80 may include memory for storing programming instructions executable by the processor as well as for electronically storing data and/or databases. For example, the computer 80 can be a generic computer with a processor and memory as described above and/or may include an electronic control unit (ECU) or controller for a specific function or set of functions, and/or a dedicated electronic circuit including an ASIC that is manufactured for a particular operation, e.g., an ASIC for processing sensor data and/or communicating the sensor data. As another example, the computer 80 may be a restraints control module. In another example, computer 80 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer 80. The memory can be of any type, e.g., hard disk drives, solid state drives, servers, or any volatile or non-volatile media. The memory can store the collected data sent from the sensors.

The computer 80 is programmed to, i.e., the memory stores instructions executable by the processor to, command the actuators 78 to extend the pins 74 to engage the apertures 72 in the spool flanges 70 to lock the seatback anti-rotation mechanism 50. The computer 80 may extend the pins 74 by providing power to a solenoid or an impulse to a pyrotechnic charge via the communication network 88. The computer 80 may be programmed to lock the spool 52 in response to detecting certain vehicle impacts. The computer 80 may determine that a certain vehicle impact has occurred or may occur based on information received from the impact sensor 86 via the communication network 88.

The computer 80 may determine that the seat 14 is occupied based on information received from the occupancy sensor 82 via the communication network 88. In an example, the computer 80 may be programmed to lock the spool 52 in response to detecting certain vehicle impacts and when the computer 80 has determined that the seat 14 is occupied.

The computer 80 may determine that the latch plate of the seatbelt assembly 32 is engaged with the buckle based on information received from the buckle sensor 84 via the communication network 88. In an example, the computer 80 may be programmed to lock the spool 52 in response to detecting certain vehicle impacts and when the computer 80 has determined that the latch plate is engaged with the buckle.

The computer 80 may determine that the seat 14 is occupied and that the latch plate of the seatbelt assembly 32 is engaged with the buckle. In another example, the computer 80 may be programmed to lock the spool 52 in response to detecting certain vehicle impacts and when the computer 80 has determined that the seat 14 is occupied and the latch plate is engaged with the buckle.

Computing devices, such as the computer 80, generally include computer-executable instructions, where the instructions may be executable by one or more computing devices such as those listed above. Computer-executable instructions may be compiled or interpreted from computer programs created using a variety of programming languages and/or technologies. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory.

The numerical adjectives first, second, etc., are used throughout this document as identifiers and do not signify importance, order, or quantity.

Use of in "response to," "based on," and "upon determining" herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seat system, comprising:

a seat including a seat bottom having a seat bottom frame and a seatback having a seatback frame pivotably supported by the seat bottom frame;

a spool rotatably mounted to the seat bottom frame;

a strap retractably extendable from the spool and fixed to the seatback frame;

the spool is rotationally biased with a torsion spring to retract the strap; and a locking mechanism movable into engagement with the spool to prevent rotation of the spool and movable out of engagement with the spool to allow rotation of the spool as biased by the torsion spring;

the seatback being pivotable with respect to the seat bottom about a pivot axis and the spool being positioned seat rearward of the pivot axis.

2. The system of claim 1, wherein the spool is mounted to the seat bottom frame cross-vehicle between a left and a right bolster of the seatback.

3. The system of claim 1, wherein the locking mechanism includes an extendable pin positioned to engage the spool when extended and an actuator to move the pin relative to the spool.

4. The system of claim 3, wherein the spool includes a pair of flanges and wherein at least one of the flanges includes multiple apertures positioned to receive the pin.

5. The system of claim 3, further comprising one or more processors and one or more memory devices storing instructions executable by the one or more processors to activate the actuator in response to certain vehicle impacts in order to lock the spool and resist forward movement of the seatback relative to the seat bottom.

6. The system of claim 3, wherein the actuator is a solenoid device.

7. The system of claim 3, wherein the actuator is a pyrotechnic device.

8. The system of claim 1, further comprising a transverse member attached to an upper portion of the seatback frame, and wherein the strap is secured to the transverse member.

9. The system of claim 8, further comprising a transverse guide bar attached to the seatback frame between the transverse member and the spool.

10. The system of claim 1, further comprising a housing secured to the seat bottom frame and wherein the spool is rotatably coupled to the housing with an axle.

11. The system of claim 10, further comprising a locking mechanism having an extendable pin to engage the spool.

12. The system of claim 11, wherein the extendable pin is parallel with the axle.

13. The system of claim 1, wherein the spool is positioned below the pivot axis.

14. The system of claim 1, wherein the strap is fabric.

15. The system of claim 1, further comprising a seatbelt assembly supported by the seat.

16. The system of claim 1, wherein the spool is rotatable about an axle and the extendable pin moves in parallel with the axle.

17. A seat system, comprising:

a seat including a seat bottom having a seat bottom frame and a seatback having a seatback frame pivotably supported by the seat bottom frame;

a spool rotatably mounted to the seat bottom frame about an axle;

a strap retractably extendable from the spool and fixed to the seatback frame; and a locking mechanism having an extendable pin to engage the spool;

the extendable pin being parallel with the axle.

18. The system of claim 17, wherein the spool is positioned below the pivot axis.

19. A seat system, comprising:

a seat including a seat bottom having a seat bottom frame and a seatback having a seatback frame pivotably supported by the seat bottom frame;

a spool rotatably mounted to the seat bottom frame;

a strap retractably extendable from the spool and fixed to the seatback frame;

the spool is rotationally biased with a torsion spring to retract the strap; and the spool being mounted to the seat bottom frame cross-vehicle between a left and a right bolster of the seatback;

the spool being mounted to the seat bottom frame cross-vehicle between a left and a right bolster of the seatback;

a locking mechanism movable into engagement with the spool to prevent rotation of the spool and movable out of engagement with the spool to allow rotation of the spool as biased by the torsion spring.

20. The system of claim 19, wherein the spool is positioned below the pivot axis.

* * * * *